(12) United States Patent
Johnson et al.

(10) Patent No.: US 12,436,378 B2
(45) Date of Patent: Oct. 7, 2025

(54) ON-GIMBAL TELESCOPE POINTING ASSEMBLY

(71) Applicant: Raytheon Company, Waltham, MA (US)

(72) Inventors: Tim P. Johnson, Torrance, CA (US); Chris Shreve, Celina, TX (US)

(73) Assignee: Raytheon Company, Arlington, VA (US)

( * ) Notice: Subject to any disclaimer, the term of this patent is extended or adjusted under 35 U.S.C. 154(b) by 380 days.

(21) Appl. No.: 17/989,546

(22) Filed: Nov. 17, 2022

(65) Prior Publication Data

US 2024/0168276 A1    May 23, 2024

(51) Int. Cl.
  *G02B 23/02*  (2006.01)
  *G02B 23/16*  (2006.01)

(52) U.S. Cl.
  CPC ........... *G02B 23/02* (2013.01); *G02B 23/165* (2013.01)

(58) Field of Classification Search
  CPC ........ G02B 23/02; G02B 23/165; G02B 5/08; G02B 7/00; G02B 7/001; G02B 7/18; G02B 7/182; G02B 7/1821; G02B 17/00; G02B 17/02; G02B 17/06; G02B 17/0647; G02B 17/0657; G02B 17/0663; G02B 17/0684; G02B 17/0689; G02B 23/00; G02B 23/16
  USPC ....... 359/399, 350, 351, 400, 423, 429, 430, 359/434, 838, 850, 857, 858, 859, 861, 359/862, 863, 865, 871, 872, 876, 877
  See application file for complete search history.

(56) References Cited

U.S. PATENT DOCUMENTS

| | | | | |
|---|---|---|---|---|
| 3,420,594 A | * | 1/1969 | Chapman | G02B 27/642 356/255 |
| 3,999,832 A | * | 12/1976 | Schlesinger | G02B 17/061 359/198.1 |
| 4,395,095 A | * | 7/1983 | Horton | G02B 17/0663 359/429 |
| 2016/0223394 A1 | * | 8/2016 | Cook | G01J 1/0411 |

FOREIGN PATENT DOCUMENTS

| | | | | |
|---|---|---|---|---|
| EP | 2525235 A1 | * | 11/2012 | F41G 3/145 |
| EP | 3218740 A1 | | 9/2017 | |
| WO | 2016126548 A1 | | 8/2016 | |

OTHER PUBLICATIONS

International Preliminary Report on Patentability dated May 30, 2025 in connection with International Patent Application No. PCT/US2023/074400, 9 pages.

* cited by examiner

*Primary Examiner* — Arnel C Lavarias

(57) ABSTRACT

An on-gimbal telescope pointing assembly can include a head mirror operable to rotate to adjust an elevation angle of the pointing assembly and an all-reflective telescope operable to rotate to adjust an azimuth angle of the pointing assembly. The all-reflective telescope can include a fold mirror defining an output coude path of the all-reflective telescope. The pointing assembly can be operable to rotate about the coude path such that receiving optics can remain fixed while the pointing assembly rotates.

20 Claims, 2 Drawing Sheets

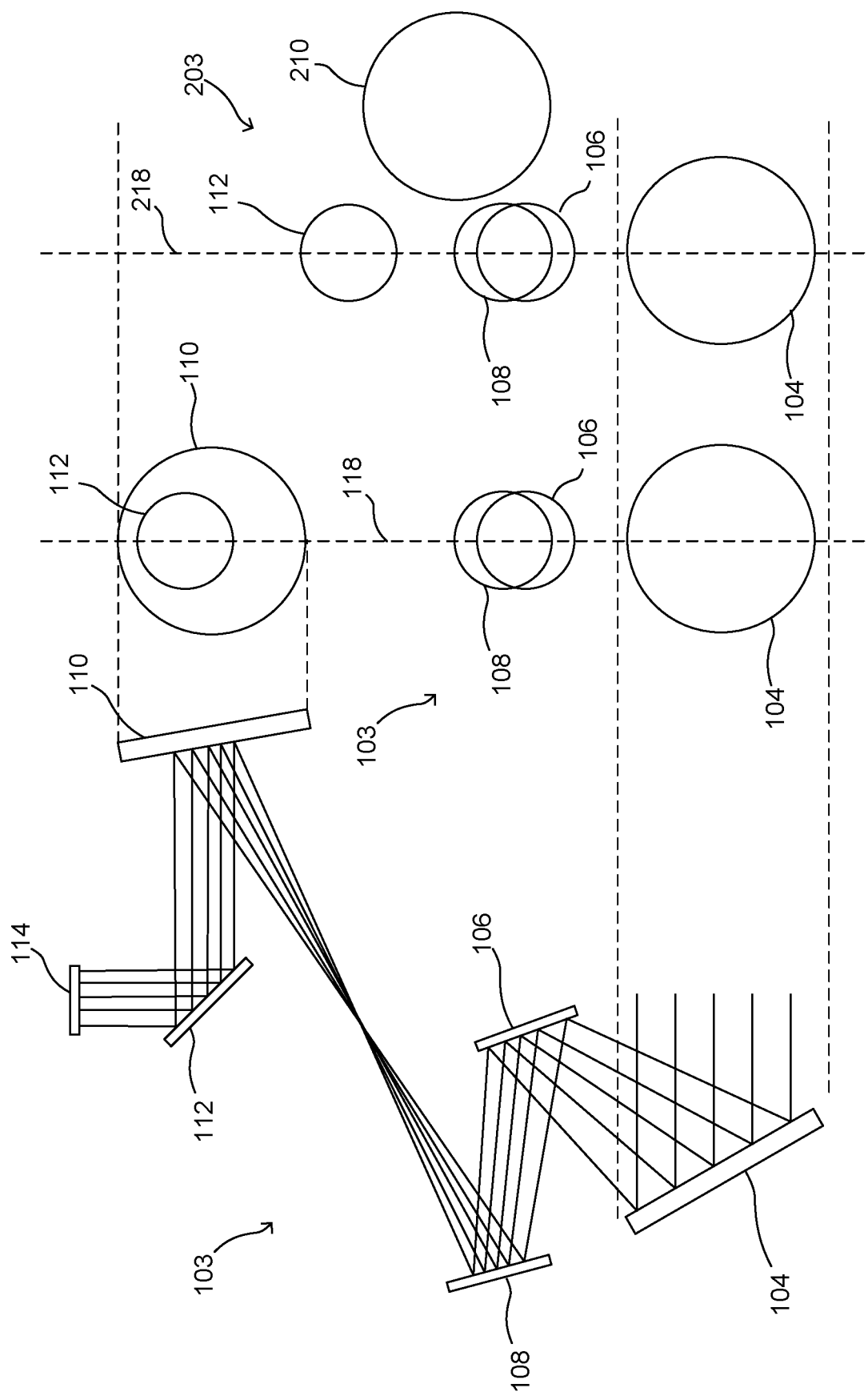

ON-GIMBAL TELESCOPE POINTING ASSEMBLY

BACKGROUND

On-gimbal telescope pointing assemblies can have a variety of important applications in various settings. For example, on-gimbal telescope pointing assemblies can be used on ground, air, or sea platforms to aid in the detection of remote objects. On-gimbal telescope pointing assemblies can comprise a narrow field of view relative to a large field of regard. Accordingly, on-gimbal telescope pointing assemblies can be developed to be agile (i.e. to have the ability to quickly point in a desired direction). Furthermore, in many applications, space and weight allocated for the on-gimbal telescope pointing assembly can be limited, such as for an on-gimbal telescope pointing assembly implemented on an aircraft.

BRIEF DESCRIPTION OF THE DRAWINGS

Features and advantages of the subject technology will be apparent from the detailed description which follows, taken in conjunction with the accompanying drawings, which together illustrate, by way of example, features of the subject technology; and, wherein:

FIG. 2A and FIG. 2B show a schematic views of an all-reflective telescope of the on-gimbal telescope pointing assembly shown in FIG. 1, and FIG. 2C shows a modified all-reflective telescope for a pointing assembly according to one example of the present disclosure.

Figure 1:
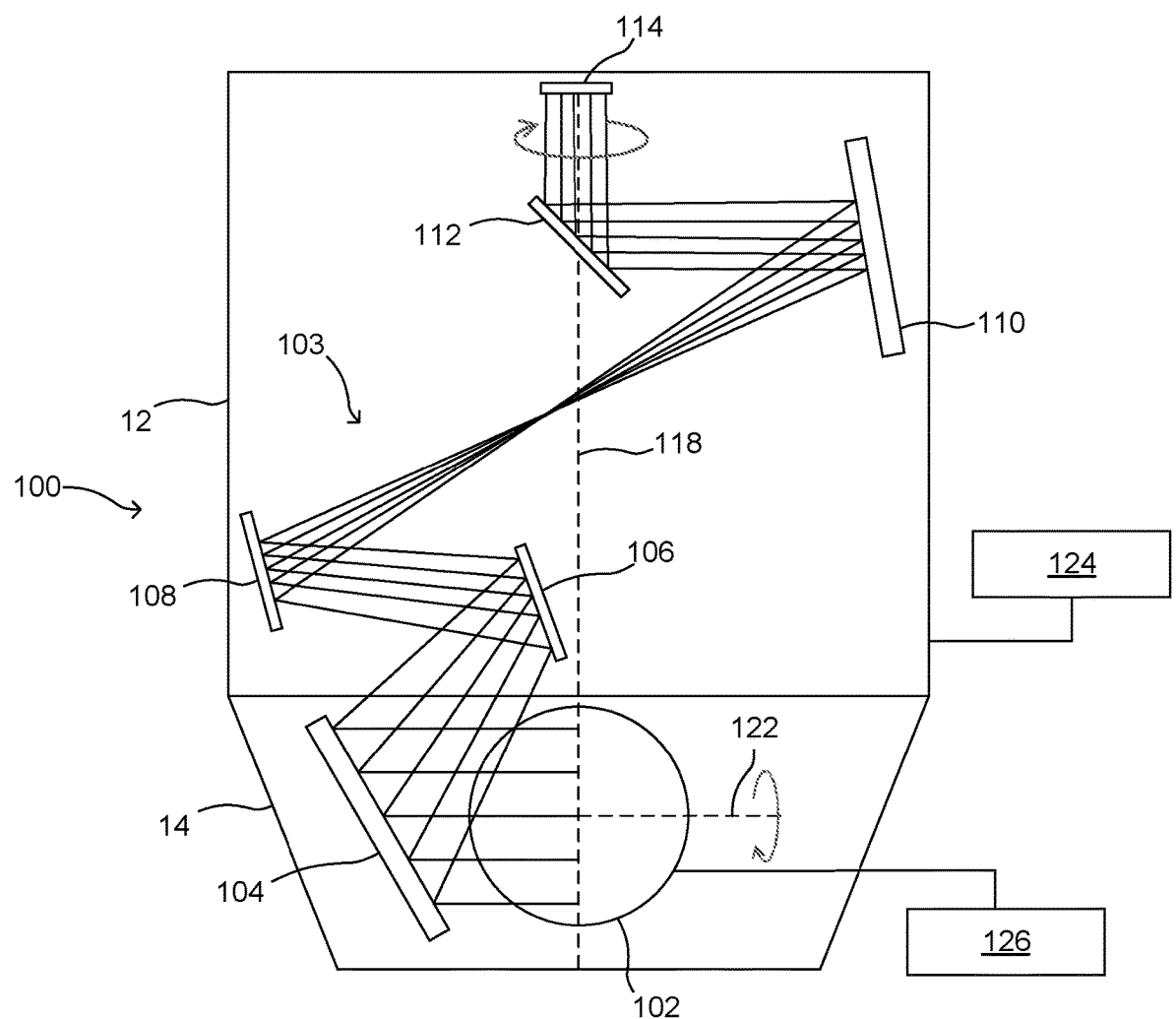
FIG. 1 is a schematic view of an on-gimbal telescope pointing assembly according to one example of the present disclosure.

Reference will now be made to the examples illustrated, and specific language will be used herein to describe the same. It will nevertheless be understood that no limitation of scope is thereby intended.

DETAILED DESCRIPTION

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Given the above, one object of the present disclosure is to provide an on-gimbal telescope pointing assembly with relatively high agility (i.e. with an ability to quickly point in a desired direction) while also having a reduced required volume and a reduced weight as compared to prior pointing assemblies. According to one example of the present disclosure, an on-gimbal telescope pointing assembly can comprise a head mirror that can be operable to rotate to adjust an elevation angle of the pointing assembly and an all-reflective telescope that can be operable to rotate to adjust an azimuth angle of the pointing assembly.

In some examples, the all-reflective telescope can comprise a fold mirror defining an output coude path of the all-reflective telescope. The pointing assembly can be operable to rotate about the coude path. The all-reflective telescope can comprise a plurality of mirrors. In one example, at least one mirror of the plurality of mirrors can be disposed or positioned off of an axis defined by the coude path. The at least one mirror can balance the telescope during rotation.

In one example, the plurality of mirrors and the fold mirror can be positioned to be centered on a single plane. In one example, the at least one mirror can be positioned off-plane from remaining mirrors of the plurality of mirrors and the fold mirror. In some examples, the at least one mirror can comprise a freeform mirror surface.

In some examples, the on-gimbal telescope pointing assembly can comprise a pointing acceleration of at least one thousand radians per second squared. The all-reflective telescope can comprise a dual band telescope operable to detect long wave infrared light and short-wave infrared light. The on-gimbal telescope pointing assembly can comprise a field of view of at least two by four degrees. The on-gimbal telescope pointing assembly can also comprise a field of regard of 360 by 90 degrees.

In one example according to the present disclosure, a method for configuring an on-gimbal telescope pointing assembly is provided. The method can comprise configuring a head mirror that is operable to adjust an elevation angle of the pointing assembly and configuring an all-reflective telescope that is operable to adjust an azimuth angle of the pointing assembly.

In some examples, the all-reflective telescope can comprise a fold mirror defining an output coude path of the on-gimbal telescope pointing assembly. The on-gimbal telescope pointing assembly can be operable to rotate about the coude path. The all-reflective telescope can comprise a plurality of mirrors. At least one mirror of the plurality of mirrors can be disposed or positioned off of an axis defined by the coude path. The at least one mirror can balance the telescope during the rotation.

In some examples, the plurality of mirrors and the fold mirror can be positioned to be centered on a single plane. In some examples, the at least one mirror can be disposed off-plane from remaining mirrors of the plurality of mirrors and the fold mirror. The at least one mirror can comprise a freeform mirror surface.

In some examples, the on-gimbal telescope pointing assembly can comprise a pointing acceleration of at least one thousand radians per second squared. The all-reflective telescope can comprise a dual band telescope operable to detect long wave infrared light and short-wave infrared light. The on-gimbal telescope pointing assembly can comprise a field of view of at least two by four degrees and a field of regard of at least 360 by 90 degrees.

In one example of the present disclosure, an on-gimbal telescope pointing assembly can comprise a head mirror operable to rotate to adjust an elevation angle of the pointing assembly and a telescope comprising a plurality of mirrors. Two or more mirrors of the plurality or mirrors can be oriented and centered along a first plane and at least one mirror of the plurality of mirrors can be positioned and centered off of the first plane.

To further describe the present technology, examples are now provided with reference to the figures. An on-gimbal telescope pointing assembly 100 is shown schematically with reference to FIG. 1. The pointing assembly 100 can be implemented on a platform to detect objects remote to the platform. For example, the pointing assembly 100 can be implemented on an air platform such as an aircraft, a land platform, or a sea platform such as on a sea-going vessel. In this example, the pointing assembly 100 can be at least partially disposed in an internal bay 12 of a platform on which the pointing assembly 100 is installed. At least a portion of the pointing assembly 100 can extend outside of the internal bay 12 such as in a window assembly 14 such that the pointing assembly 100 can receive light from outside of the platform.

The pointing assembly 100 can comprise a head mirror 102 operable to receive light from outside the platform on which the pointing assembly 100 is installed. The head mirror 102 can be operable to be rotated to change a pointing elevation angle of the pointing assembly 100. The head mirror 102 can be positioned and operable to direct light towards an all-reflective telescope 103 of the pointing assembly 100. By all-reflective telescope it is meant that the telescope includes mirrors and does not include lenses as optical elements of the telescope. Thus, the all-reflective telescope 103 can comprise a plurality of mirrors 104, 106, 108, 110, and a fold mirror 112. In this example, the all-reflective telescope 103 can comprise a four mirror anastigmat. A first mirror 104 of the all-reflective telescope 103 can be positioned and configured to receive incoming light from the head mirror 102. The light can then be directed from the first mirror to a second mirror 106, a third mirror 108, and a fourth mirror 110 that are positioned and operable to magnify and direct the light according to a desired magnification and to correct optical aberrations in an image. The fourth mirror 110 can be positioned and operable to direct the light to receiving optics 114 via the fold mirror 112. For example, the receiving optics 114 can comprise one or more cameras having image sensors to detect the light and transmit image information to a memory of a computer or other device located on the platform or remote from the platform.

The head mirror 102 and the all-reflective telescope 103 can be operable to rotate to change a pointing azimuth angle of the pointing assembly 100. In one example, the head mirror 102 and the all-reflective telescope 103 can be attached to the platform, such as the internal bay 12 of the platform via an azimuth rotational interface system 124. The azimuth rotational interface system 124 can facilitate as much as 360 degrees of rotation for changing the pointing azimuth angle of the pointing assembly 100. The azimuth rotational interface system 124 can comprise a rotational interface between at least a portion the pointing assembly 100 and the platform on which the pointing assembly is installed. For example, the azimuth rotational interface system 124 can comprise one or more gimbals or bearings facilitating an azimuth rotation between at least a portion of the pointing assembly 100 and the platform. The azimuth rotational interface system 124 can also comprise actuators such as electric motors that can optionally be coupled with one or more transmissions to rotate the pointing assembly 100 to change the pointing elevation angle and the pointing azimuth angle. For example, the pointing assembly 100 can comprise an azimuth actuator 124 that is operable to rotate the pointing assembly 100 via the bearing to change the pointing azimuth angle of the pointing assembly 100.

The pointing assembly 100 can also comprise an elevation rotational interface system 126 that is operable to rotate the head mirror 102 to change an elevation pointing angle of the head mirror. In some examples, the elevation rotational interface system 126 can comprise a gimbal or bearing along with one or more actuators that can optionally be coupled with one or more transmissions to facilitate rotation of the head mirror 102 to change an elevation pointing angle.

In the example shown in FIG. 1, the pointing assembly 100 can be rotated about an axis 118 to change the pointing azimuth angle of the pointing assembly 100. The head mirror 102 can be rotated about an axis 122 that is perpendicular to the axis 118 to change the pointing elevation angle of the pointing assembly 100. In some examples, the head mirror 102 can be positioned to be centered about the axis 118 such that when the pointing assembly 100 is rotated to change the pointing azimuth angle, the head mirror 102 rotates in place about the axis 118. In one example, the pointing assembly 100 can be configured to have a field of view of at least two by four degrees and a field of regard of at least 140 by 30 degrees. In some examples, a field of regard can by 360 degrees by 90 degrees. It is noted that these are exemplary and that the field of regard can be any desired field of regard based on the "vignetting" of the surrounding structure. For example, instead of a 360 degree by 90-degree field of regard, the field of regard could be 180 degrees by 180 degrees.

The all-reflective telescope 103 used in the pointing assembly 100 comprises several advantages over prior pointing assemblies that use lenses. For example, for a pointing assembly that is installed onto a ground, sea, or air platform, and that has a desired aperture of around four inches, an all reflective telescope can have a reduced weight as compared to a telescope that comprises lenses. The head mirror 102, mirrors 104, 106, 108, 110, and the fold mirror 112 can be formed from beryllium or a beryllium alloy which can provide for a light-weight optical element as compared to a similarly sized lens. Because the all-reflective telescope 103 can be lighter in weight than a prior telescope in an on-gimbal telescope pointing assembly that comprises lenses, the pointing assembly 100 can be more agile than the prior pointing assembly. That is, the pointing assembly 100 can be more easily accelerated to point in a desired direction as compared to a prior pointing assembly with lenses. This can allow the pointing assembly 100 to achieve faster pointing accelerations as compared to prior pointing assemblies, or to achieve similar pointing accelerations as compared to prior pointing assemblies while requiring less power from the actuators on the pointing assemblies. In other words, in some examples, the relatively lower weight of the pointing assembly 100 can facilitate the use of smaller actuators as compared to prior pointing assemblies while still achieving desired pointing accelerations. In some examples, a desired pointing acceleration can be at least 1000 radians per second squared.

Another advantage of the all-reflective telescope 103 is that the pointing assembly 100 can be operable to detect multiple wavelengths bands via the same aperture. In other words, the all-reflective telescope can comprise a dual band telescope. For example, the all-reflective telescope 103 can be configured to receive both long wave infrared light ("LWIR") and short-wave infrared light ("SWIR") and to direct both LWIR and SWIR to the receiving optics 114. In one example, the receiving optics 114 can comprise a light splitter that splits the LWIR and SWIR to be received at respective sensors for LWIR and SWIR. Of course, by using an all-reflective telescope, the all-reflective telescope is not limited to only a dual band telescope detecting LWIR and SWIR. The all-reflective telescope 103 can have an unlimited number of bands which can range, for example, from ultraviolet to LWIR. The detected spectrum by the all-reflective telescope 103 can be optimized for any desired spectrum based on the optical coating used on the mirrors of the all-reflective telescope 103.

The pointing assembly 100 can be configured such that the at least one of the plurality of mirrors 104, 106, 108, 110 is disposed or positioned off of the axis 118 about which the pointing assembly 100 rotates. In this example, the third mirror 108 and fourth mirror 110 are positioned relatively far apart from one another on opposite sides of the axis 118.

With one or more of the mirrors 104, 106, 108, 110 positioned off of the axis 118, the all-reflective telescope 103 can be considered an all-reflective, off-axis telescope. Furthermore, the all-reflective telescope 103 can be configured such that the mirror 106 and the mirror 110 are not vertically coaxial (i.e. are not coaxial in a direction parallel to the axis 118). That is, in the example shown in FIG. 1, the fourth mirror 110 is pulled back away from the mirrors 104, 106, and 108.

The all-reflective telescope 103 of the pointing assembly 100 being an all-reflective, off-axis telescope can provide a number of advantages over prior pointing assemblies. For example, with the fourth mirror 110 pulled into an off-axis position away from the axis 118 (and away from the mirrors 104, 106, 108), the pointing assembly 100 can be more easily balanced to rotate about the axis 118. In other words, the pointing assembly 100 can be fairly balanced without extra weights, which decreases the need for such extra weights such as ballasts to achieve a fully balanced system. Thus, the weight of the pointing assembly 100 can be further reduced as compared to prior pointing assemblies. This reduced weight can further decrease the required power to rotate the pointing assembly 100 due to a decrease in a moment of inertia of the pointing assembly 100 as compared to prior systems. This also allows the bearing to be smaller than prior systems, which further decreases the weight and moment of inertia of the pointing assembly 100.

Further, with the mirror 110 pulled into an off-axis position, the fold mirror 112 can be positioned on the axis of rotation (axis 118), such that the axis of rotation lies along the coude path of the all-reflective telescope 103. In other words, the output beam of the all-reflective telescope 103 is configured to be co-axial with the axis 118 about which the pointing assembly 100 rotates. In this manner, the output beam of the all-reflective telescope 103 remains coaxial with the axis 118 when the pointing assembly 100 rotates. This enables the receiving optics 114 to remain fixed while the pointing assembly 100 rotates, further reducing power required to rotate the pointing assembly 100 as compared to prior pointing assemblies.

Another advantage of the off-axis, all-reflective telescope is that there can be a relatively slow f/# between the mirror 108 and the mirror 110. That can allow the off-axis, all-reflective telescope 103 of the pointing assembly 100 to be used in laser applications, such as with LIDAR. For example, the relatively slow f/# can avoid the risk of air breakdown between the third mirror 108 and the fourth mirror 110.

FIGS. 2A, 2B, and 2C illustrate a modification of an on-gimbal telescope pointing assembly that can facilitate further space savings on a pointing assembly. FIG. 2A schematically shows the all-reflective telescope 103 as explained above. FIG. 2B schematically shows the all-reflective telescope rotated ninety degrees from the position in FIG. 2A. As can be seen in FIG. 2B, the mirrors 104, 106, 108, 110, 112 of the all-reflective telescope 103 are each centered on a plane intersecting the axis 118 and perpendicular to the page showing FIGS. 2A-2C. That is, the all-reflective telescope is configured to be symmetric about the plane intersecting axis 118 and perpendicular to the page showing FIGS. 2A-2C.

FIG. 2C schematically illustrates a modification of the all-reflective telescope 103. In FIG. 2C, an all reflective telescope 203 is similar to the all-reflective telescope 103 in many respects. As shown in FIG. 2C, the all-reflective telescope 203 comprises mirrors 104, 106, 108 that are similarly positioned as in the all-reflective telescope 103. In the all-reflective telescope 203, the mirror 210 is positioned not only to be off-axis, but to also be off-plane. That is, the mirror 210 is not centered on a plane intersecting the axis 218 and perpendicular to the page showing FIGS. 2A-2C. With mirror 210 being off-plane the all-reflective telescope 203 is not symmetric about the plane intersecting axis 218 and perpendicular to the page showing FIGS. 2A-2C. FIG. 2C.

When the mirror 210 is positioned to be off-plane, the mirror 210 can be positioned such that the all-reflective telescope 203 can be more compact than the all-reflective telescope 103. Comparing the all-reflective telescope 103 shown in FIGS. 2A and 2B to the all-reflective telescope 203 shown in FIG. 2C, a height of the all-reflective telescope 203 along the axis 218 can be made less than a height of the all-reflective telescope 103 along axis 118. It should also be noted that even though the mirror 210 is off-plane, the width of the pointing assembly does not increase as compared to using the all-reflective telescope 103 because the mirror 210 remains within the same swept volume that is required in the all-reflective telescope 103. Thus, when implemented on a pointing assembly, such as the pointing assembly 100, the all-reflective telescope 203 can allow the pointing assembly to take up less volume on a platform. As another benefit, the all-reflective telescope 203 can allow for no central obscuration (e.g. obscurations that can exist in a Cassegrain telescope).

In order to maintain image quality in the all-reflective telescope 203 with the mirror 210 positioned off-plane, the mirror 210 can comprise a freeform mirror. A freeform mirror can allow for more variety in surface shapes which can allow more control over image aberrations even though the all-reflective telescope 203 is not symmetric. A freeform surface can typically be a function of two variables: p, the radius (normalized), and $\Phi$, the rotation angle. In some examples, the mirror 210 can comprise a freeform mirror with a surface that can be defined by a Zernike polynomial (i.e., a Zernike surface). In prior applications of pointing assemblies, plane symmetrical Zernike surfaces are used. However, in the all-reflective telescope 203 that includes at least one mirror positioned off-plane, it can be beneficial for image quality to not only use plane symmetrical Zernike surfaces, but also Zernike surfaces without plane symmetry (i.e. Zernike surfaces that are not plane symmetric), or that are symmetric about a new plane. By incorporating a Zernike surface on the mirror 210, the mirror 210 can compensate for the lack of symmetry in the all-reflective telescope 203 to allow better optimization of aberration control.

It is noted that other modifications are also possible. For example, while FIG. 2C shows only the mirror 210 being positioned in an off-plane position, it can also be possible to move one or more of the others mirrors 106, 108 into an off-plane position. Further, while the configurations shown in the figures comprise a four mirror anastigmat and a fold mirror, other configurations of all-reflective telescopes can be used such a three mirror or five mirror anastigmat.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An on-gimbal telescope pointing assembly comprising:
   a head mirror operable to rotate to adjust an elevation angle of the pointing assembly; and
   an all-reflective telescope operable to rotate to adjust an azimuth angle of the pointing assembly, wherein the all-reflective telescope comprises:
      a fold mirror defining an output coude path of the all-reflective telescope, wherein the pointing assembly is operable to rotate about the coude path; and
      a plurality of mirrors, wherein at least one mirror of the plurality of mirrors is disposed off of an axis defined by the coude path, the at least one mirror balancing the all-reflective telescope during rotation.

2. The assembly of claim 1, wherein the plurality of mirrors and the fold mirror are positioned to be centered on a single plane.

3. The assembly of claim 1, wherein the at least one mirror is positioned off-plane from remaining mirrors of the plurality of mirrors and the fold mirror.

4. The assembly of claim 3, wherein the at least one mirror comprises a freeform mirror surface.

5. The assembly of claim 1, wherein the on-gimbal telescope pointing assembly comprises a pointing acceleration of at least one thousand radians per second squared.

6. The assembly of claim 1, wherein the all-reflective telescope comprises a dual band telescope operable to detect long wave infrared light and short wave infrared light.

7. An on-gimbal telescope pointing assembly comprising:
   a head mirror operable to rotate to adjust an elevation angle of the pointing assembly; and
   an all-reflective telescope operable to rotate to adjust an azimuth angle of the pointing assembly;
   wherein the on-gimbal telescope pointing assembly comprises a field of view of at least two by four degrees.

8. The assembly of claim 1, wherein the on-gimbal telescope pointing assembly comprises a field of regard of at least 360 by 90 degrees.

9. A method for configuring an on-gimbal telescope pointing assembly, the method comprising:
   configuring a head mirror that is operable to adjust an elevation angle of the pointing assembly; and
   configuring an all-reflective telescope that is operable to adjust an azimuth angle of the pointing assembly, wherein the all-reflective telescope comprises:
      a fold mirror defining an output coude path of the pointing assembly, wherein the pointing assembly is operable to rotate about the coude path; and
      a plurality of mirrors, wherein at least one mirror of the plurality of mirrors is disposed off of an axis defined by the coude path, the at least one mirror balancing the all-reflective telescope during rotation.

10. The method of claim 9, wherein the plurality of mirrors and the fold mirror are positioned to be centered on a single plane.

11. The method of claim 9, wherein the at least one mirror is disposed off-plane from remaining mirrors of the plurality of mirrors and the fold mirror.

12. The method of claim 11, wherein the at least one mirror comprises a freeform mirror surface.

13. The method of claim 9, wherein the pointing assembly comprises a pointing acceleration of at least one thousand radians per second squared.

14. The method of claim 9, wherein the all-reflective telescope comprises a dual band telescope operable to detect long wave infrared light and short wave infrared light.

15. The method of claim 9, wherein the pointing assembly comprises a field of view of at least two by four degrees and a field of regard of at least 360 by 90 degrees.

16. An on-gimbal telescope pointing assembly comprising:
   a head mirror operable to rotate to adjust an elevation angle of the pointing assembly; and
   a telescope comprising a plurality of mirrors, wherein two or more mirrors of the plurality of mirrors are oriented and centered along a first plane;
   wherein one of the two or more mirrors comprises a fold mirror defining an output coude path of the telescope;
   wherein the pointing assembly is operable to rotate about the coude path; and
   wherein at least one mirror of the plurality of mirrors is positioned and centered off of the first plane and is disposed off of an axis defined by the coude path, the at least one mirror balancing the telescope during rotation.

17. The assembly of claim 16, wherein the at least one mirror comprises a freeform mirror surface.

18. The assembly of claim 16, wherein the pointing assembly comprises a pointing acceleration of at least one thousand radians per second squared.

19. The assembly of claim 16, wherein the telescope comprises a dual band telescope operable to detect long wave infrared light and short wave infrared light.

20. The assembly of claim 16, wherein the pointing assembly comprises a field of view of at least two by four degrees and a field of regard of at least 360 by 90 degrees.

* * * * *